US012763594B2

(12) United States Patent
Kim

(10) Patent No.: US 12,763,594 B2
(45) Date of Patent: Oct. 13, 2026

(54) CHARGING AND DISCHARGING DEVICE FOR SECONDARY BATTERY

(71) Applicant: LG ENERGY SOLUTION, LTD., Seoul (KR)

(72) Inventor: Ki Hoon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 864 days.

(21) Appl. No.: 18/022,811

(22) PCT Filed: Sep. 15, 2021

(86) PCT No.: PCT/KR2021/012625
§ 371 (c)(1),
(2) Date: Feb. 23, 2023

(87) PCT Pub. No.: WO2022/060100
PCT Pub. Date: Mar. 24, 2022

(65) Prior Publication Data

US 2023/0307932 A1 Sep. 28, 2023

(30) Foreign Application Priority Data

Sep. 15, 2020 (KR) ........................ 10-2020-0118543

(51) Int. Cl.
*H02J 7/00* (2026.01)
*H02J 7/70* (2026.01)

(52) U.S. Cl.
CPC .................................... *H02J 7/751* (2026.01)

(58) Field of Classification Search
USPC ........................................................... 320/107
See application file for complete search history.

(56) References Cited

U.S. PATENT DOCUMENTS

2017/0248659 A1* 8/2017 Choi ................. H01M 10/4285
2023/0420790 A1* 12/2023 Lim ...................... H01M 50/30

FOREIGN PATENT DOCUMENTS

| | | | |
|---|---|---|---|
| CN | 105044406 | A | 11/2015 |
| CN | 209198510 | U | 8/2019 |
| KR | 2000-0006810 | U | 4/2000 |
| KR | 10-2013-0071638 | A | 7/2013 |
| KR | 10-2013-0071639 | A | 7/2013 |
| KR | 10-2014-0067227 | A | 6/2014 |
| KR | 10-2014-0067229 | A | 6/2014 |

(Continued)

OTHER PUBLICATIONS

Machine Translation of KR20120071638A (Year: 2013).*

(Continued)

*Primary Examiner* — Samuel Berhanu
(74) *Attorney, Agent, or Firm* — Birch, Stewart, Kolasch & Birch, LLP

(57) ABSTRACT

A charging and discharging device for secondary battery includes a body portion; and a head portion located under the body portion, wherein the head portion comprises a pin mounting portion that is bound to the upper portion or lower portion of the secondary battery, wherein the pin mounting portion includes a current pin and a voltage pin, wherein the current pin and the voltage pin each comprises a plurality of projections, and wherein an area where the current pin is formed is larger than an area where the voltage pin is formed.

5 Claims, 6 Drawing Sheets

(56) References Cited

FOREIGN PATENT DOCUMENTS

| | | | |
|---|---|---|---|
| KR | 10-1468034 | B1 | 12/2014 |
| KR | 10-2015-0037189 | A | 4/2015 |
| WO | WO 2016/047857 | A1 | 3/2016 |

OTHER PUBLICATIONS

Extended European Search Report for corresponding European Application No. 21869722.5, dated Feb. 13, 2024.
International Search Report (PCT/ISA/210) issued in PCT/KR2021/012625, dated Jan. 4, 2022.
Written Opinion of the International Searching Authority (PCT/ISA/237) issued in PCT/KR2021/012625, dated Jan. 4, 2022.

* cited by examiner

【FIG. 1】
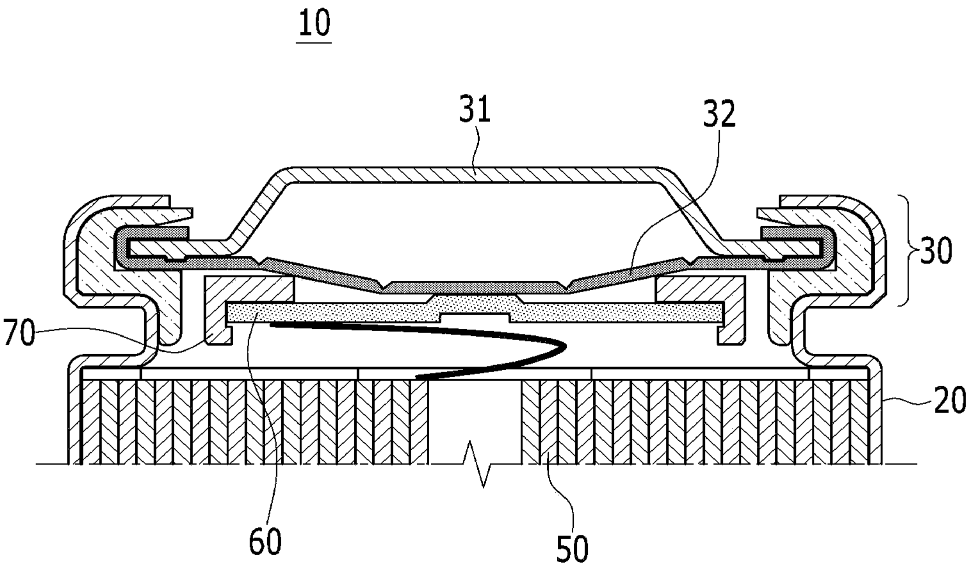

【FIG. 2】
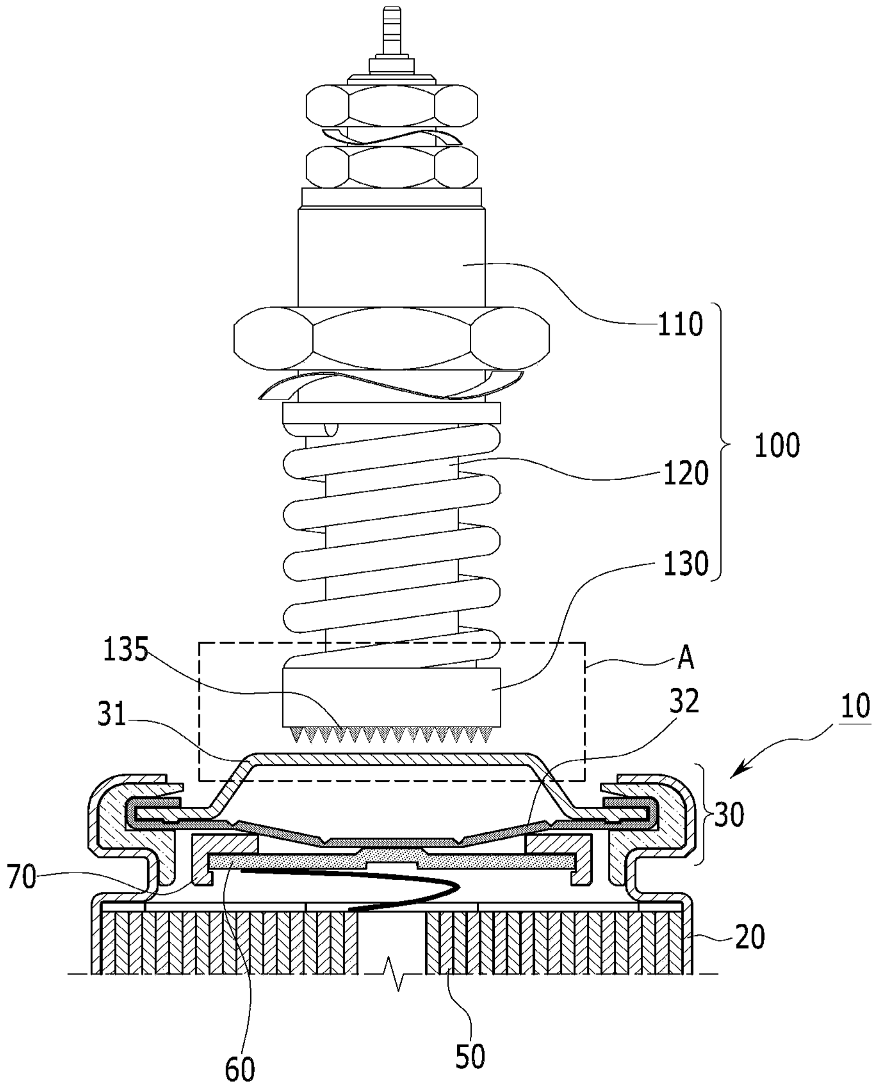

【FIG. 3】
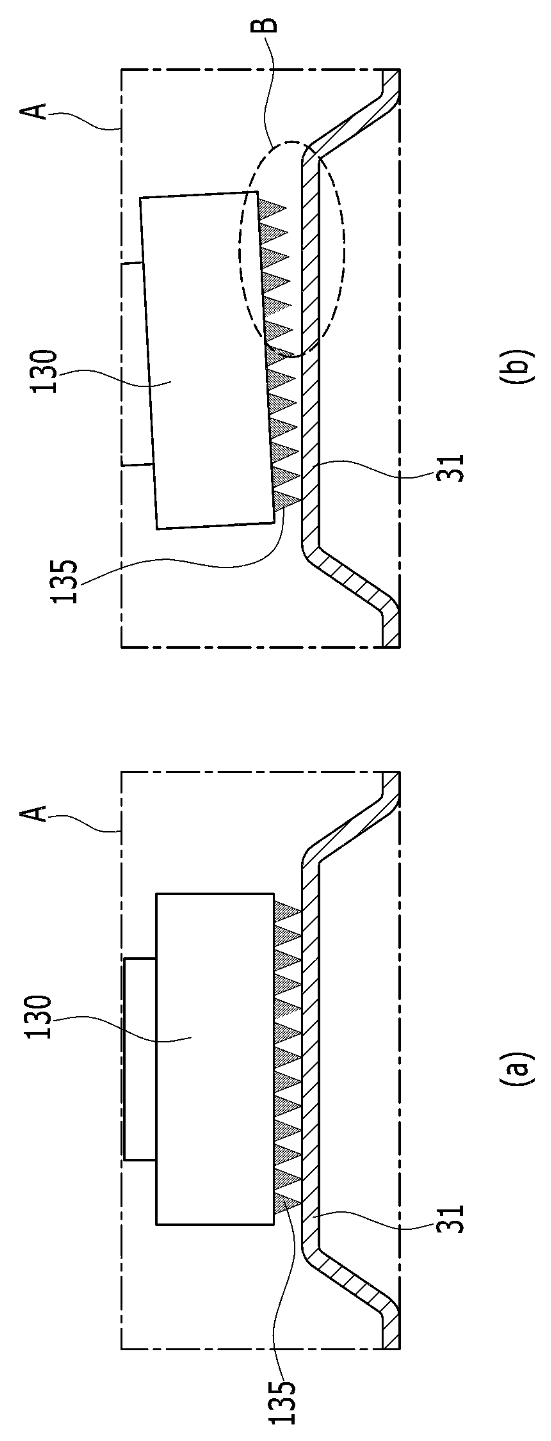

【FIG. 4】
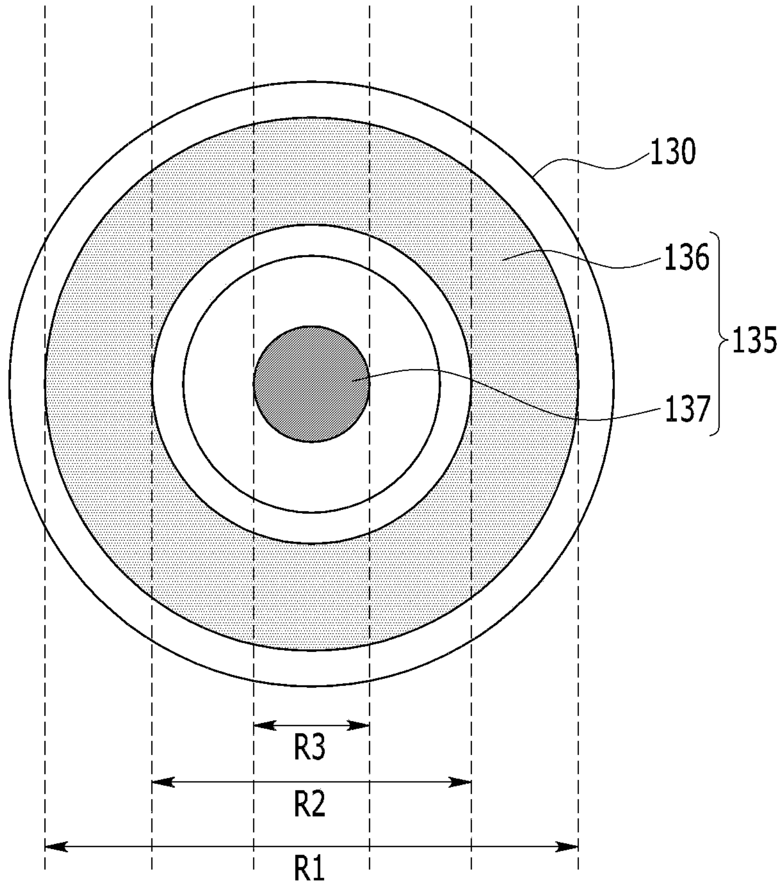

【FIG. 5】
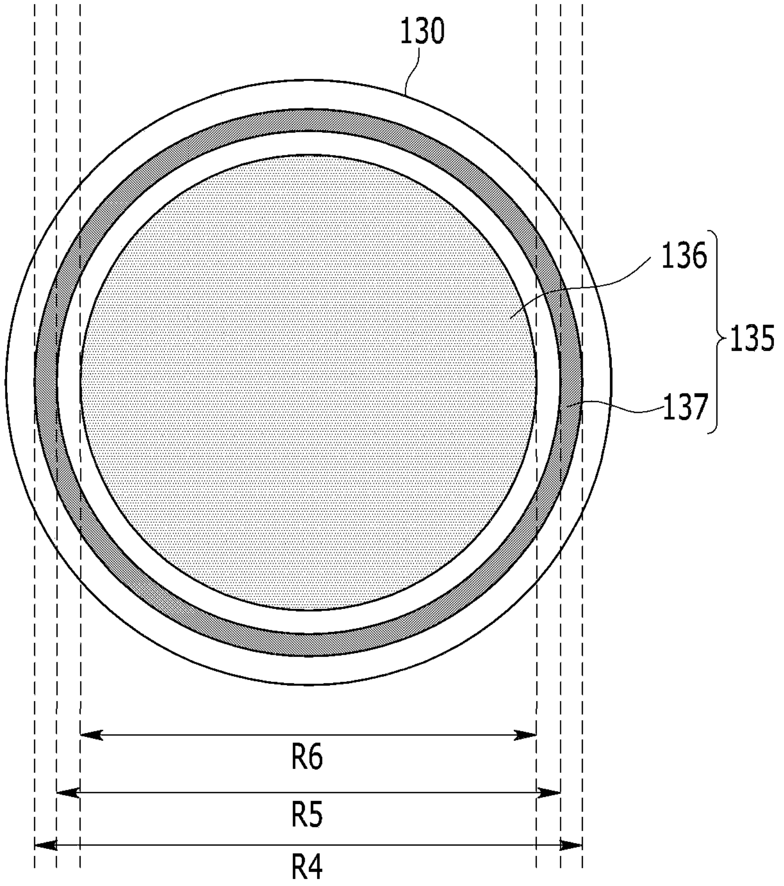

【FIG. 6】
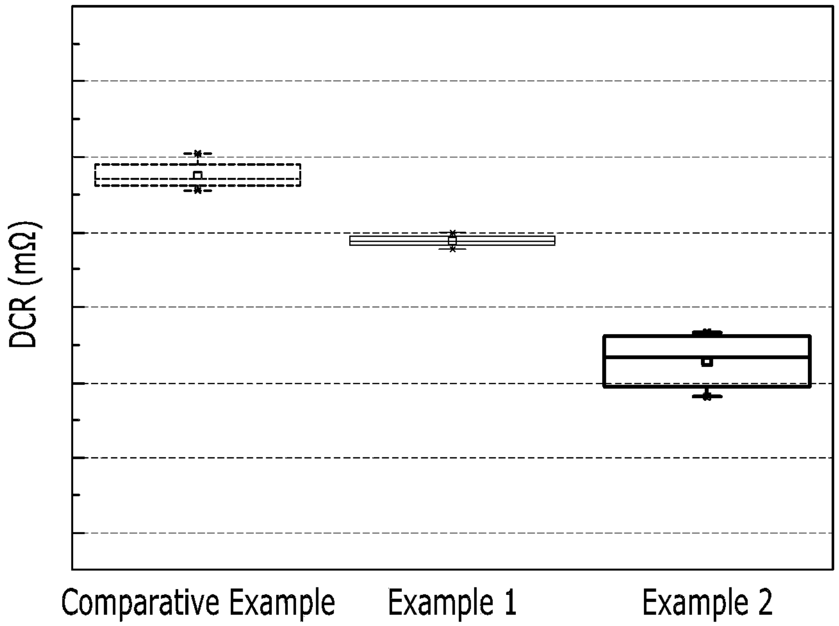

CHARGING AND DISCHARGING DEVICE FOR SECONDARY BATTERY

TECHNICAL FIELD

Cross Citation with Related Application(s)

This application claims the benefit of Korean Patent Application No. 10-2020-0118543 filed on Sep. 15, 2020 with the Korean Intellectual Property Office, the disclosure of which is incorporated herein by reference in its entirety.

The present disclosure relates to a charging and discharging device for secondary battery, and more particularly to a charging and discharging device for secondary battery having improved contact resistance.

BACKGROUND

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Based on the shape of a battery case, such a secondary battery is classified into a cylindrical battery where an electrode assembly is built in a cylindrical metal can, a prismatic battery where an electrode assembly is built in a prismatic metal can, and a pouch type battery where an electrode assembly is built in a pouch type case formed of an aluminum laminate sheet. Among them, the cylindrical battery has an advantage of having a relatively large capacity and being structurally stable.

The battery performance of such a secondary battery is evaluated through a charge and discharge process after the assembling process, and whether the battery is defective can be detected. At this time, the charge and discharge process of the secondary battery can be performed through a secondary battery charging and discharging device including a probe pin to which current and voltage are applied.

However, when charging at a high rate in the charge and discharge process of the secondary battery, a heat generation phenomenon due to contact resistance may occur at the contact portion of the secondary battery to which the probe pins of the secondary battery charging and discharging device contact, which causes a problem that the accuracy of the battery performance evaluation of the secondary battery is lowered.

Therefore, there is a need to develop a charging and discharging device for a secondary battery having improved contact resistance.

DETAILED DESCRIPTION OF THE INVENTION

Technical Problem

It is an object of the present disclosure to provide a charging and discharging device for secondary battery having improved contact resistance.

The objects of the present disclosure are not limited to the aforementioned objects, and other objects which are not described herein should be clearly understood by those skilled in the art from the following detailed description and the accompanying drawings.

Technical Solution

According to an aspect of the present disclosure, there is provided a charging and discharging device for a secondary battery, comprising: a body portion; and a head portion located under the body portion, wherein the head portion comprises a pin mounting portion configured to be bound to the upper portion or lower portion of the secondary battery, wherein the pin mounting portion includes a current pin and a voltage pin, wherein each of the current pin and the voltage pin comprises a plurality of projections, and wherein an area where the current pin is formed is larger than an area where the voltage pin is formed.

The current pin may be formed in a maximum area that can be formed in the pin mounting portion, and the voltage pin may be formed in a minimum area that can be formed in the pin mounting portion.

The current pin may be formed in an area of 70% or more and 99% or less of a total area of the pin mounting portion, and the voltage pin may be formed in an area of 1% or more and 15% or less of the total area of the pin mounting portion.

The voltage pin may be formed in the center of the pin mounting portion, and the current pin may be formed at the periphery of the pin mounting portion so as to surround the voltage pin.

The voltage pin may have a diameter of 0.01 or more and 0.2 or less of a diameter of the pin mounting portion.

The current pin and the voltage pin may be located apart from each other by a first distance.

The first distance may be between 0.01 to 0.5 times a diameter of the pin mounting portion.

The current pin may be formed in the center of the pin mounting portion, and the voltage pin may be formed at a periphery of the pin mounting portion so as to surround the current pin.

The current pin may have a diameter of 0.5 or more and 0.9 or less of a diameter of the pin mounting portion.

The current pin and the voltage pin may be located apart from each other by a first distance.

The first distance may be between 0.01 to 0.5 times a diameter of the pin mounting portion.

Advantageous Effects

According to embodiments of the present disclosure, the charging and discharging device for a secondary battery of the present disclosure can improve the contact resistance.

The effects of the present disclosure are not limited to the effects mentioned above and additional other effects not described above will be clearly understood from the detailed description and the appended drawings by those skilled in the art.

BRIEF DESCRIPTION OF THE DRAWINGS

FIG. 1 is a partial cross-sectional view of an upper portion of a cylindrical secondary battery;

FIG. 2 is a view showing a charging and discharging device for a secondary battery according to an embodiment of the present disclosure;

FIG. 3 is an enlarged view of the region A of FIG. 2;

FIG. 4 is a view showing a pin mounting portion according to an embodiment of the present disclosure in the charging and discharging device for a secondary battery of FIG. 2;

FIG. 5 is a view showing a pin mounting portion according to another embodiment of the present disclosure in the charging and discharging device for a secondary battery of FIG. 2; and FIG. 6 is a view showing the result of resistance value according to a pin mounting portion of the charging and discharging device for a secondary battery of FIG. 2.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as “including” a certain component, it means that the portion can further include other components, without excluding the other components, unless otherwise stated.

Further, throughout the description, when referred to as “planar”, it means when a target portion is viewed from the upper side, and when referred to as “cross-sectional”, it means when a target portion is viewed from the side of a cross section cut vertically.

Now, a charging and discharging device for a secondary battery according to an embodiment of the present disclosure will be described. However, the secondary battery 10 herein is not limited to a cylindrical battery, and the secondary batteries having various shapes can also be described with same or similar contents.

FIG. 1 is a partial cross-sectional view of an upper portion of a cylindrical secondary battery.

Referring to FIG. 1, the secondary battery 10 can be manufactured by housing an electrode assembly 50 in a cylindrical case 20, and housing a cap assembly 30 on an opened upper portion of the cylindrical case 20.

Here, the cap assembly 30 includes an upper end cap 31 and a safety vent 32 for internal pressure drop, and the upper end cap 31 and the safety vent 32 for internal pressure drop may form a structure in close contact with each other.

Further, the safety vent 32 may be electrically connected to the electrode assembly 50 via a current interrupt device (CID), and a CID gasket 70 can wrap the edge of the current interrupt device 60.

FIG. 2 is a view showing a charging and discharging device for a secondary battery according to an embodiment of the present disclosure.

Referring to FIG. 2, the charging and discharging device 100 for a secondary battery can come into contact with the upper end cap 31 of the secondary battery 10 and apply a charging current.

Here, the charging and discharging device 100 for a secondary battery includes body portions 110 and 120, a head portion 130, and a pin mounting portion 135.

The body portions 110 and 120 may be configured by a plurality of plungers. In one example, the body portions 110 and 120 may include an external plunger 110 having a cylindrical shape through which the inside is penetrated, and an internal plunger 120 that flows up and down in the interior of the external plunger 110. The head portion 130 may be located under the internal plunger 120.

The pin mounting portion 135 may be located under the head portion 130. Further, the pin mounting portion 135 can be bound to the upper portion or lower portion of the secondary battery 10. In one example, the pin mounting portion 135 may be bound to the upper end cap 31 of the secondary battery 10.

The pin mounting portion 135 includes a current pin 136 and a voltage pin 137. At this time, each of the current pin 136 and the voltage pin 137 includes a plurality of protrusions. In one example, the current pin 136 and/or the voltage pin 137 may include a plurality of protrusions having a shape such as conic or triangular pyramid with a pointed tip. Thereby, the current pin 136 and/or the voltage pin 137 can increase the contact area with the cap assembly 30 of the secondary battery 10 and thus, improve the contact resistance by the current pin 136 and/or the voltage pin 137.

FIG. 3 is an enlarged view of the region A of FIG. 2. FIG. 3(*a*) is a view showing a state in which the secondary battery 10 is normally bound to the charging and discharging device 100 for a secondary battery, and FIG. 3(*b*) is a diagram showing a state in which the secondary battery 10 is abnormally bound to the charging and discharging device 100 for a secondary battery.

Referring to FIG. 3, in the charging and discharging device 100 for a secondary battery, the upper end cap 31 and the pin mounting portion 135 can be abnormally bound to each other, in addition to the case where the upper end cap 31 and the pin mounting portion 135 are normally bound. Particularly, in the case of FIG. 3(*b*), a non-contact region B that does not come into contact with the pin mounting portion 135 can be generated at the periphery of the upper end cap 31, unlike FIG. 3(*a*). Thereby, in the case of FIG. 3(*b*), due to the non-contact area B, the contact area between the upper end cap 31 and the current pin 136 of the pin mounting portion 135 that comes into contact with the upper end cap 31 is reduced, so that the contact resistance by the current pin 136 can be increased.

Thus, from a viewpoint that the pin mounting portion 135 includes a current pin 136 and a voltage pin 137 within a limited area, the charging and discharging device 100 for a secondary battery according to an embodiment of the present disclosure adjusts the arrangement and area of the current pin 136 and the voltage pin 137, and thus can reduce the non-contact region B of the upper end cap 31 and the contact resistance of the current pin 136.

Next, the pin mounting portion 135 of the charging and discharging device 100 for a secondary battery according to an embodiment of the present disclosure will be mainly described in more detail.

In the pin mounting portion 135, the contact resistance by the current pin 136 may be changed in proportion to the area in which the current pin 136 is formed. In one example, the pin mounting portion 135 is configured such that an area in which the current pin 136 is formed may be larger than an area in which the voltage pin 137 is formed. In one example, the current pin 136 in the pin mounting portion 135 is formed in the maximum area that can be formed in the pin mounting portion 135, and the voltage pin 137 may be formed in the minimum area that can be formed in the pin mounting portion 135.

Thus, referring to FIG. 2, the pin mounting portion 135 of the charging and discharging device 100 for a secondary battery according to an embodiment of the present disclosure allows the increase of the contact area between the upper end cap 31 and the current pin 136, so that the contact resistance by the current pin 136 can be increased.

FIG. 4 is a view showing a pin mounting portion 135 according to an embodiment of the present disclosure in the charging and discharging device 100 for a secondary battery of FIG. 2.

Referring to FIG. 4, the pin mounting portion 135 is configured such that a voltage pin 137 is formed in the center of the pin mounting portion 135. Further, in the pin mounting portion 135, the current pin 136 is formed on the periphery of the pin mounting portion 135, and the current pin 136 may be formed so as to surround the voltage pin 137.

Referring to FIG. 4, when the voltage pin 137 in the pin mounting portion 135 is formed in the center of the pin mounting portion 135, the diameter R3 of the voltage pin 137 may be 0.01 or more and less than 0.25 relative to the diameter R1 of the pin mounting portion 135. More preferably, the diameter R3 of the voltage pin 137 may be 0.01 or more and 0.23 or less relative to the diameter R1 of the pin mounting portion 135. In one example, the diameter R3 of the voltage pin 137 may be 0.01 or more and 0.2 or less relative to the diameter R1 of the pin mounting portion 135.

Thus, when the pin mounting portion 135 includes the voltage pin 137 having a diameter that satisfies the above-mentioned range, the area that the voltage pin 137 can be formed in the pin mounting portion 135 can be reduced, so that the area that the current pin 136 can form in the pin mounting portion 135 can be increased. Consequently, referring to FIGS. 2 and 4, in the charging and discharging device 100 for a secondary battery according to an embodiment of the present disclosure, the contact area between the current pin 136 and the upper end cap 31 is increased, so that the contact resistance can be reduced. Further, the occurrence of heat generation phenomenon can be prevented, and the accuracy of the battery performance evaluation of the secondary battery can be improved.

When the pin mounting portion 135 includes a voltage pin 137 in which the diameter R3 of the voltage pin 137 is less than 0.01 relative to the diameter R1 of the pin mounting portion 135, the accuracy of the existence of charging/discharging of the secondary battery measured from the voltage pin may decrease. Further, when the pin mounting portion 135 includes a voltage pin 137 in which the diameter R3 of the voltage pin 137 is greater than 0.25 relative to the diameter R1 of the pin mounting portion 135, the area of the current pin 136 is reduced, whereby a contact resistance may be increased as a current is applied from the current pin 136 to the secondary battery 10. Here, the diameter R1 of the pin mounting portion 135 may be the same as or larger than the outer diameter of the current pin 136.

Further, referring to FIG. 4, the pin mounting portion 135 can be configured such that the current pin 136 and the voltage pin 137 are located apart from each other.

More specifically, in the pin mounting portion 135, the distance between the current pin 136 and the voltage pin 137 that are spaced apart from each other may be 0.01 or more to 0.5 or less relative to the diameter R1 of the pin mounting portion 135. More preferably, the distance between the current pin 136 and the voltage pin 137 that are spaced apart from each other may be 0.03 or more and 0.4 or less relative to the diameter R1 of the pin mounting portion 135. In one example, the distance between the current pin 136 and the voltage pin 137 that are spaced apart from each other may be 0.05 or more to 0.35 or less relative to the diameter R1 of the pin mounting portion 135.

Thereby, when the pin mounting portion 135 includes a current pin 136 and a voltage pin 137 having a distance that satisfies the above-described range, the area that the current pin 136 can form is increased and the area that the voltage pin 137 can form in the pin mounting portion 135 can be reduced, so that the contact resistance by the current pin 136 can be reduced. In addition, the occurrence of a heat generation phenomenon can be prevented, and the accuracy of the battery performance evaluation of the secondary battery can be improved.

FIG. 5 is a view showing a pin mounting portion according to another embodiment of the present disclosure in the charging and discharging device for a secondary battery of FIG. 2.

Referring to FIG. 5, a current pin 136 is formed in the center of the pin mounting portion 135. Further, the voltage pin 137 may be formed on the periphery of the pin mounting portion 135, and the voltage pin 137 may be formed so as to surround the current pin 136. Thereby, even if the current pin 136 is formed in the center of the pin mounting portion 135 and the secondary battery 10 and the pin mounting portion 135 are abnormally bound, the influence on the degree of binding between the current pin 136 and the secondary battery 10 can be reduced.

Referring to FIG. 5, when the current pin 136 is formed in the center of the pin mounting portion 135, the diameter R6 of the current pin 136 may be 0.5 or more and 0.9 or less relative to the diameter R4 of the pin mounting portion 135. More preferably, the diameter R6 of the current pin 136 may be 0.6 or more and 0.9 or less relative to the diameter R4 of the pin mounting portion 135. In one example, the diameter R6 of the current pin 136 may be 0.7 or more and 0.9 or less relative to the diameter R4 of the pin mounting portion 135. Here, the diameter R4 of the pin mounting portion 135 may be equal to or larger than the outer diameter of the voltage pin 137.

Thereby, when the pin mounting portion 135 includes a current pin 136 having a diameter that satisfies the above-mentioned range, the area that the current pin 136 can be formed in the pin mounting portion 135 can be increased. Consequently, referring to FIGS. 2 and 5, in the charging and discharging device 100 for a secondary battery according to an embodiment of the present disclosure, the contact area between the current pin 136 and the upper end cap 31 can be increased, so that the contact resistance can be reduced. In addition, the occurrence of a heat generation phenomenon can be prevented, and the accuracy of the battery performance evaluation of the secondary battery can be improved.

When the pin mounting portion 135 includes a current pin 136 in which the diameter R6 of the current pin 136 is less than 0.5 relative to the diameter R4 of the pin mounting portion 135, the area of the current pin 136 is reduced, whereby a contact resistance can be increased as a current is applied from the current pin 136 to the secondary battery 10. Further, when the pin mounting portion 135 includes a current pin 136 in which the diameter R6 of the current pin 136 is greater than 0.9 relative to the diameter R4 of the pin mounting portion 135, the area of the voltage pin 137 is excessively reduced, and the accuracy of the existence of charging/discharging of the secondary battery 10 measured from the voltage pin 137 may be deteriorated.

Further, referring to FIG. 5, the current pin 136 and the voltage pin 137 may be located apart from each other within the pin mounting portion 135.

More specifically, the pin mounting portion 135 may be configured such that the distance between the current pin 136 and the voltage pin 137 that are spaced apart from each other is 0.01 or more to 0.5 or less relative to the diameter R4 of the pin mounting portion 135. More preferably, the distance between the current pin 136 and the voltage pin 137 that are spaced apart from each other may be 0.03 or more to 0.4 or less relative to the diameter R4 of the pin mounting portion 135. In one example, the distance between the current pin 136 and the voltage pin 137 that are spaced apart from each other may be 0.05 or more to 0.35 or less relative to the diameter R4 of the pin mounting portion 135.

Thereby, when the pin mounting portion 135 includes a current pin 136 and a voltage pin 137 having a distance that satisfies the above-mentioned range, the area where the current pin 136 can be formed is increased and at the same time, the area where the voltage pin 137 can be formed in the pin mounting portion 135 can be reduced, so that contact resistance by the current pin 136 may be reduced. In addition, the occurrence of a heat generation phenomenon can be prevented, and the accuracy of the battery performance evaluation of the secondary battery can be improved.

Referring to FIGS. 4 and 5, the current pin 136 may be formed in an area of 70% or more and 99% or less relative to the total area of the pin mounting portion 135. More specifically, the current pin 136 may be formed in an area of 75% or more and 90% or less relative to the total area of the pin mounting portion 135. In one example, the current pin 136 may be formed in an area of 75% or more and 85% or less relative to the total area of the pin mounting portion 135. Further, the voltage pin 137 may be formed in an area of 1% or more and 15% or less relative to the total area of the pin mounting portion 135. More specifically, the voltage pin 137 may be formed in an area of 1% or more and 10% or less relative to the total area of the pin mounting portion 135. In one example, the voltage pin 137 may be formed in an area of 3% or more to 10% or less relative to the total area of the pin mounting portion 135. Here, the total area of the pin mounting portion 135 is equal to or larger than the area that is based on the outer diameter of the current pin 136 or the voltage pin 137 located at the periphery of the current pin 136 and the voltage pin 137.

Thereby, when the pin mounting portion 135 includes the current pin 136 and the voltage pin 137 having an area that satisfies the above-mentioned range, the area where the current pin 136 can be formed is increased and at the same time, the area where the voltage pin 137 can be formed in the pin mounting portion 135 can be reduced, so that contact resistance by the current pin 136 can be reduced. In addition, the occurrence of a heat generation phenomenon can be prevented, and the accuracy of the battery performance evaluation of the secondary battery can be improved.

When the area of the current pin 136 is less than 70% of the total area of the pin mounting portion 135 and the area of the voltage pin 137 is more than 10% relative to the total area of the pin mounting portion 135, the area of the current pin 136 is excessively reduced, whereby a contact resistance may increase as a current is applied from the current pin 136 to the secondary battery 10. In addition, when the area of the current pin 136 is more than 99% relative to the total area of the pin mounting portion 135 and the area of the voltage pin 137 is less than 1% relative to the total area of the pin mounting portion 135, the area of the voltage pin 137 is excessively reduced, whereby the accuracy of the existence of charging/discharging of the secondary battery 10 measured from the voltage pin 137 may be deteriorated.

Hereinafter, the contents of the present disclosure will be described by way of examples, but the following examples are provided for illustrative purposes only and the scope of the present disclosure is not limited thereto.

Example 1

Referring to FIG. 4, the charging and discharging device for a secondary battery according to Example 1 was formed in which the voltage pin 137 had a diameter of 1.5 pi at the center of the pin mounting portion 135, and the current pin 136 had an outer diameter of 8 pi and also an inner diameter of 4.0 pi in the periphery of the pin mounting portion 135.

Example 2

Referring to FIG. 5, the charging and discharging device for a secondary battery according to Example 2 was formed in which the current pin 136 had a diameter of 7 pi at the center of the pin mounting portion 135, and the voltage pin 137 had an outer diameter of Bpi and also an inner diameter of 7.6 pi in the periphery of the pin mounting portion 135.

Comparative Example

Referring to FIG. 4, the charging and discharging device for a secondary battery according to Comparative Example was formed in which the voltage pin 137 had a diameter of 2.0 pi at the center of the pin mounting portion 135, and the current pin 136 had an outer diameter of 8 pi and also an inner diameter of 4.5 pi in the periphery of the pin mounting portion 135.

<Experimental Example 1> Number of Cell Contact Current Pins

When the charging and discharging devices of Examples 1 and 2 and Comparative Examples was bound to a 21700 cylindrical battery (diameter: 21 mm, height: 70 mm), the number of crowns of the current pins in each charging and discharging device bound to the cylindrical battery was measured. At this time, in the case of Comparative Example, it corresponds to the current pin of CA293CC (Leeno Industrial).

TABLE 1

| | Current pin area($cm^2$) | Number of crowns of cell contact current pins |
|---|---|---|
| Example 1 | 37.7 | 368 |
| Example 2 | 38.5 | 376 |
| Comparative Example | 34.3 | 335 |

Referring to Table 1, it can be confirmed that Examples 1, 2, and Comparative Example are identical in the total area of the pin mounting portion 135, but as the area of the current pin 136 included in the pin mounting portion 135 is larger, the number of crowns of cell contact current pins is also larger. More specifically, in Examples 1 and 2, the area of the current pin is larger than that of Comparative Example, and the number of crowns of cell contact current pins also increases. Therefore, in the charging and discharging device 100 for a secondary battery according to an embodiment of the present disclosure, the area of the current pins 136 is increased and the number of crowns of cell contact current pins is increased, as compared with the conventional case, and the contact resistance of the current pin 136 resulting therefrom can be reduced. In addition, the occurrence of a heat generation phenomenon can be prevented due to the reduction of the resistance generated at the time of applying a current, and the accuracy of the battery performance evaluation of the secondary battery can be improved.

Further, comparing Example 1 and Example 2, it can be confirmed that the sizes of the current pin areas are not significantly different from each other, but the number of crowns of cell contact current pins has a large difference compared to the difference in the area of the current pins. Thereby, it can be confirmed that the case where the current pin 136 is located at the center as in Example 2 has a larger cell contact area of the current pin as compared to Example 1. Therefore, in the case of Example 2, the contact resistance of the current pin 136 can be further improved, the occurrence of a heat generation phenomenon can be more prevented, and the accuracy of the battery performance evaluation of the secondary battery may also be further improved, as compared with Example 1, <Experimental Example 2> Resistance Value Data DC resistance values during high-rate charging and discharging for Examples 1 and 2 and Comparative Example were measured, respectively. A 21700 cylindrical battery (diameter: 21 mm, height: 70 mm) was charged at 5 C-rate for 30 seconds with the charging and discharging devices of Examples 1, 2, and Comparative Examples, and then the voltage change amount and the current value at this time were measured, and the DC resistance value (me) was calculated. The results are shown in FIG. 6.

FIG. 6 is a view showing the result of resistance value according to a pin mounting portion of the charging and discharging device for a secondary battery of FIG. 2.

Referring to Table 1 and FIG. 6, it can be confirmed that Examples 1, 2, and Comparative Examples are identical in the total area of the pin mounting portion 135, but as the area of the current pin 136 included in the pin mounting portion 135 increases, the DC resistance value (mΩ) decreases. More specifically, both Examples 1 and 2 have a larger area of the current pin than that of Comparative Example, and the DC resistance value (mΩ) is decreased compared to Comparative Example. Therefore, it can be confirmed that in the charging and discharging device 100 for a secondary battery according to an embodiment of the present disclosure, as the area of the current pin 136 increases compared to the conventional case, the contact resistance of the current pin 136 is reduced. Therefore, in the charging and discharging devices of Examples 1 and 2, the occurrence of a heat generation phenomenon can be prevented, and the accuracy of the battery performance evaluation of the secondary battery can be improved.

Further, comparing Example 1 and Example 2, it can be confirmed that the sizes of the areas of the current pins are not significantly different from each other, but the width of reduction in the contact resistance is large. Thereby, it can be confirmed that when the current pin 136 is located at the center as in Example 2, the effect of reducing the contact resistance of the current pin is larger compared to Example 1. Thereby, it can be confirmed that in the case of Example 2, the contact resistance of the current pin 136 is more improved as compared with Example 1. Therefore, in the charging and discharging device of Example 2, the occurrence of a heat generation phenomenon can be more prevented, and the accuracy of the battery performance evaluation of the secondary battery can be further improved.

Although the invention has been shown and described above with reference to the preferred embodiments, the scope of the present disclosure is not limited thereto, and numerous other modifications and improvements can be devised by those skilled in the art using the basic principles of the invention described in the appended claims, which also falls under the spirit and scope of the present disclosure.

DESCRIPTION OF REFERENCE NUMERALS

10: secondary battery
100: charging and discharging device for secondary battery
110, 120: body portion
130: head portion
135: pin mounting portion
136: current pin
137: voltage pin

The invention claimed is:

1. A charging and discharging device for a secondary battery, comprising:

a body portion; and a head portion located under the body portion, wherein the head portion comprises a pin mounting portion configured to be bound to an upper portion or a lower portion of the secondary battery, wherein the pin mounting portion comprises a current pin and a voltage pin, wherein the current pin and the voltage pin each comprise a plurality of projections, wherein an area where the current pin is formed is larger than an area where the voltage pin is formed, wherein the current pin is formed in a center of the pin mounting portion, wherein the voltage pin is formed at a periphery of the pin mounting portion so as to surround the current pin, wherein the current pin has a diameter of 0.5 or more and 0.9 or less times a diameter of the pin mounting portion.

2. The charging and discharging device for the secondary battery according to claim 1, wherein:

the current pin is formed in a maximum area in the pin mounting portion, and the voltage pin is formed in a minimum area in the pin mounting portion.

3. The charging and discharging device for the secondary battery according to claim 1, wherein:

the current pin is formed in an area of 70% or more and 99% or less of a total area of the pin mounting portion, and the voltage pin is formed in an area of 1% or more and 15% or less of the total area of the pin mounting portion.

4. The charging and discharging device for the secondary battery according to claim 1, wherein:

the current pin and the voltage pin are spaced apart from each other by a first distance.

5. The charging and discharging device for the secondary battery according to claim 4, wherein:

the first distance is between 0.01 to 0.5 times a diameter of the pin mounting portion.

* * * * *